United States Patent
Yi et al.

(10) Patent No.: US 8,485,739 B2
(45) Date of Patent: Jul. 16, 2013

(54) OPTICAL TRANSCEIVER MODULE HAVING A DEFORMABLE HEAT SINK STRUCTURE

(75) Inventors: Robert Yi, San Jose, CA (US); Paul Yu, Mountain View, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 296 days.

(21) Appl. No.: 13/075,262

(22) Filed: Mar. 30, 2011

(65) Prior Publication Data

US 2012/0251057 A1    Oct. 4, 2012

(51) Int. Cl.
G02B 6/36    (2006.01)

(52) U.S. Cl.
USPC ........................................................... 385/92

(58) Field of Classification Search
None
See application file for complete search history.

(56) References Cited

U.S. PATENT DOCUMENTS

| | | |
|---|---|---|
| 5,845,031 A | 12/1998 | Aoki |
| 6,788,540 B2 | 9/2004 | Kruger et al. |
| 6,958,907 B2 | 10/2005 | Sato et al. |
| 7,281,864 B2 | 10/2007 | Mizue et al. |
| 7,371,965 B2 * | 5/2008 | Ice .................................. 174/50 |
| 7,539,018 B2 * | 5/2009 | Murr et al. ..................... 361/704 |
| 7,859,849 B2 * | 12/2010 | Ice ................................. 361/715 |
| 7,974,098 B2 * | 7/2011 | Oki et al. ....................... 361/715 |
| 8,081,470 B2 * | 12/2011 | Oki et al. ....................... 361/715 |

FOREIGN PATENT DOCUMENTS

JP    2001144361 A    5/2001

* cited by examiner

Primary Examiner — Sung Pak

(57) ABSTRACT

A heat dissipation solution is provided that includes a heat sink structure that has a very high thermal conductivity and includes elements or features that can be deformed to increase the contact surface areas between the heat sink structure and the module casing, thereby decreasing thermal resistance. By increasing the thermal conductivity and the sizes of the surface areas that are used for transferring heat, the temperature difference between the temperature of the light source and the temperature of the module casing can be decreased to enable the light source to be operated at higher data rates. Furthermore, deformation of the deformable features also removes space between the optical subassembly and the module body caused by mechanical tolerance differences that occur during manufacturing.

25 Claims, 4 Drawing Sheets

OPTICAL TRANSCEIVER MODULE HAVING A DEFORMABLE HEAT SINK STRUCTURE

TECHNICAL FIELD OF THE INVENTION

The invention relates to optical transceiver modules. More particularly, the invention relates to an optical transceiver module having a deformable heat sink structure that reduces thermal resistance along the heat dissipation path.

BACKGROUND OF THE INVENTION

In optical communications networks, optical transceiver modules are used to transmit and receive optical signals over optical fibers. On the transmit side of a transceiver module, a light source (e.g., a laser diode) generates amplitude modulated optical signals that represent data, which are received by an optics system of the transceiver module and focused by the optics system into an end of a transmit optical fiber. The signals are then transmitted over the transmit fiber to a receiver node of the network. On the receive side of the transceiver module, the optics system of the transceiver module receives optical signals output from an end of a receive optical fiber and focuses the optical signals onto an optical detector (e.g., a photodiode), which converts the optical signals into electrical signals. The electrical signals are then processed to recover the data contained in the electrical signals.

The transmit and receive fiber cables have connectors on their ends (e.g., LC connectors), that are adapted to mate with transmit and receive receptacles, respectively, formed in the transceiver module. A variety of optical transceiver module configurations are used in optical communications network. Some optical transceiver modules have multiple laser diodes on the transmit side and multiple photodiodes on the receive side for simultaneously transmitting multiple optical signals and receiving multiple optical signals, respectively. In these types of transceiver modules, the transmit fiber cables and the receive fiber cables have multiple transmit and multiple receive optical fibers, respectively. The transmit and receive fiber cables are typically ribbon cables having ends that are terminated in a connector module that is adapted to be plugged into a receptacle of the transceiver module.

Some optical transceiver modules have a single laser diode on the transmit side and a single photodiode on the receive side for simultaneously transmitting an optical signal and receiving an optical signal over transmit and receive fiber cables, respectively. Each of the cables has a single transmit and a single receive fiber, respectively. The ends of the transmit and receive cables have connectors on them that are adapted to plug into transmit and receive receptacles, respectively, formed in the transceiver module. These types of transceiver modules are often referred to as pluggable transceiver modules. Small form-factor pluggable (SFP) and SFP+ transceiver modules are examples of pluggable optical transceiver modules.

Typically, pluggable transceiver modules, such as the SFP and SFP+ transceiver modules, for example, are designed to be inserted into cages. The pluggable transceiver modules and the cages have locking features disposed on them that allow the transceiver modules to mate with an interlock with the cages. The pluggable transceiver modules typically include latch lock pins that are designed to be received in latch openings formed in the cages. In order to mate the pluggable transceiver module with the cage, the module is inserted into the cage and a latching mechanism is moved to a latching position to cause the latch lock pin on the transceiver module to be extended into the latch opening formed in the cage. In order to remove the transceiver module from the cage, the latching mechanism is moved to a de-latching position to cause the latch lock pin to be retracted from the latch opening, allowing the transceiver module to be pulled out of the cage.

FIG. 1 illustrates a side cross-sectional view of the transmit side of a known SFP optical transceiver module 2. The receive side of the module cannot be seen in the side cross-sectional view depicted. The transceiver module 2 includes a module connector 4 and a module receptacle 5 that are mated with each other and encased within a module casing 6. The module connector 4 includes a ferrule 7 that holds an end (not shown) of an optical fiber (not shown). The module receptacle 5 includes a module body 5a and an optical subassembly (OSA) 8. The OSA 8 includes an optics system 9, a laser diode 11, and other electrical components (not shown), such as a laser driver integrated circuit (IC) and a receiver IC (not shown), and another opto-electronic component, such as a photodiode (not shown), that operates as a light detector. In the example of the known SFP optical transceiver module 2 shown in FIG. 2, the laser diode 11 is a vertical cavity surface emitting laser diode (VCSEL). A rectangular heat sink structure 13 is disposed within the casing 6 and has a surface 13a that is in contact with the substrate of the VCSEL 11. The heat sink structure 13 typically made of a metal, such as copper or nickel-plated copper. Another surface 13b of the heat sink structure 13 is in contact with a non-metallic thermal pad 14, which is sandwiched between the surface 13b and the inner surfaces 6a of the module casing 6. The thermal pad 14 typically has a thermal conductivity of about 1 Watt per Kelvin-meter (W/K-m).

Heat generated by the VCSEL 11 is transferred through the heat sink structure 13 into the thermal pad 14, which then thermally couples the heat into the module casing 6. The heat spreads out in the casing 6 and is dissipated. A temperature sensor 15 is used to monitor the temperature of the module casing 6. The thermal pad 14 not only helps thermally, but also is necessary to remove additional space between the OSA 8 and the module body 5a caused by mechanical tolerance differences between these parts. When the OSA 8 is assembled to the module body 5a, mechanical tolerance differences between these parts often results in these parts not being properly aligned. The sandwiching of the thermal pad 14 between the surface 13b of the heat sink structure 13 and the inner surfaces 6a of the module casing 6 removes the additional space caused by mechanical tolerance differences. This, in turn, ensures proper mechanical alignment of the OSA 8 within the module body 5a.

Switch manufacturers are typically required to ensure that the module casings of optical transceiver modules are maintained at around 70° Celsius (C). With current data rates of around 10 gigabits per second (Gbps), the maximum allowable temperature for the substrate of the VCSEL 11 before performance starts to degrade is about 85° C. This means that the thermal resistance between the module case and the VCSEL 11 is allowed to be relatively large as long as the maximum temperature difference between the substrate of the VCSEL 11 and the module casing 6 does not exceed 15° C. The heat sink structure 13 in combination with the thermal pad 14 is generally capable of achieving these goals. In such a configuration, the best temperature difference between the substrate of the VCSEL 11 and the module casing 6 achievable is around 5 to 10° C., depending on the thermal conductivity of the thermal pad 14 and the heat sink structure 13.

For current generation pluggable optical transceiver modules, it is clear that this solution and the resultant temperature drop that it achieves are more than sufficient to satisfy the thermal requirements for the VCSEL 11. However, as data rate demands increase, the amount of power consumed at both the transceiver module level and at the switch level also increase, which makes it more difficult to maintain the module casing 6 at around 70° C. Additionally, the higher data rates make it necessary to lower the maximum allowable temperature of the substrate of the VCSEL 11 to about 75° C., which reduces the amount of margin available for the temperature difference between the temperatures of the module casing 6 and the substrate of the VCSEL 11. Therefore, it is apparent that a new solution is needed that will be capable of overcoming these obstacles.

Accordingly, a need exists for a heat sink solution that is capable of meeting these thermal dissipation demands as laser diode data rates increase. A need also exists for a heat sink solution that is capable of meeting such thermal dissipation demands while also removing additional space caused by mechanical tolerance differences of parts in the same way in which the thermal pad 14 performs that function.

SUMMARY OF THE INVENTION

The invention provides an optical transceiver module having an improved heat dissipation solution and a method for dissipating heat in an optical transceiver module. The optical transceiver module comprises a module casing, a receptacle, an OSA, and a heat sink structure. The module casing has at least inner and outer surfaces and a first end having an opening formed therein. The receptacle is secured within the opening formed in the first end of the module casing. The receptacle is configured to receive at least a first optical connector having an end of at least a first optical fiber secured therein. The OSA includes at least a light source for producing light and an optics system for coupling the light produced by the light source between the end of the optical fiber and the light source. The heat sink structure is mechanically and thermally coupled to the OSA. At least a portion of the heat sink structure is in contact with a portion of the light source to allow heat produced by the light source to pass into the heat sink structure. At least one surface of the heat sink structure is in contact with the inner surface of the module casing to allow heat to pass from the heat sink structure into the module casing. At least one of the heat sink structure and the module casing is deformable in a predetermined manner such that when the heat sink structure or the module casing is deformed, the sizes of the contacting surface areas on the surface of the heat sink structure and on the surface of the module casing increase. The increase in the sizes of the contacting surface areas decreases thermal resistance along a thermal pathway from the light source to the module casing.

The method comprises providing an optical transceiver module having a module casing, a receptacle secured within the module casing, and an OSA disposed within the module casing, disposing a heat sink structure within the module casing such that the heat sink structure is mechanically and thermally coupled to the OSA, and deforming at least one of the heat sink structure and the module casing such that sizes of contacting surface areas on at least one surface of the heat sink structure and on at least one surface of the module casing increase. The increase in the sizes of the contacting surface areas decreases thermal resistance along a thermal pathway from the light source to the module casing.

Decreasing the thermal resistance along the thermal pathway allows the temperature difference between the temperature of the module casing and the temperature of the light source to be decreased. Decreasing this temperature difference, in turn, means that the temperature of the light source can be lowered as needed to prevent performance degradation when operating at higher data rates.

These and other features and advantages of the invention will become apparent from the following description, drawings and claims.

DETAILED DESCRIPTION OF AN ILLUSTRATIVE EMBODIMENT

Figure 1:
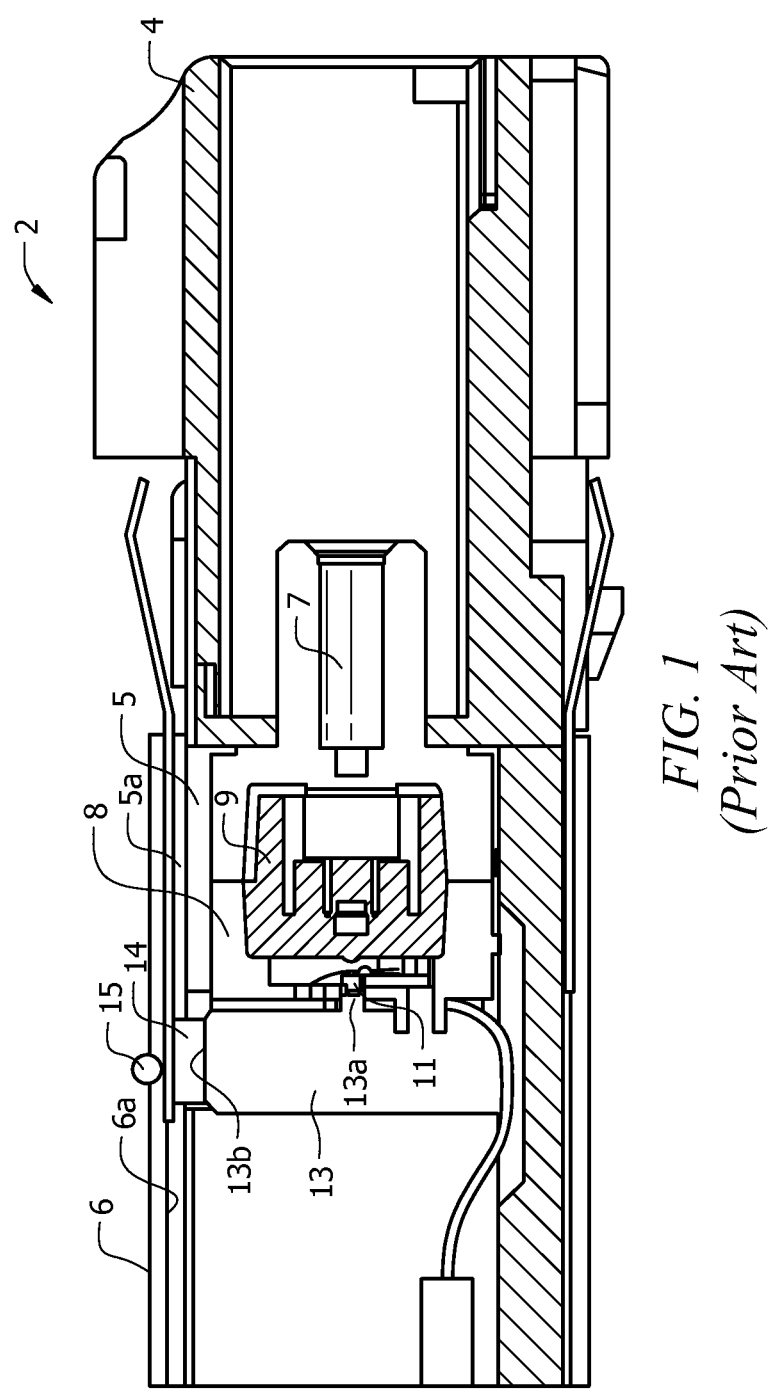
FIG. 1 illustrates a side cross-sectional view of the transmit side of a known pluggable optical transceiver module that incorporates a known heat sink structure.

In accordance with various embodiments that will be described herein, a heat dissipation solution is provided that includes a heat sink structure that has a thermal conductivity that is one or more orders of magnitude higher than the thermal conductivity of the non-metallic thermal pad 14 shown in FIG. 1. In addition, the heat dissipation solution includes elements or features that can be deformed to increase the sizes of the contacting surface areas on the heat sink structure and on the module casing, thereby decreasing thermal resistance. By increasing thermal conductivity and the sizes of the contacting surface areas, the temperature difference between the temperature of the laser diode and the temperature of the module casing can be decreased to enable the laser diode to operate at higher data rates. Furthermore, deformation of the deformable features of the heat dissipation solution also additional space between the OSA and the module body caused by mechanical tolerance differences that occur during manufacturing in the same way in which the thermal pad 14 performs that function.

The heat dissipation solution is being described herein with reference to its use in a small form factor optical transceiver module having a transmit side and a receive side. The optical transceiver module that incorporates the heat dissipation solution may be, for example, an SFF, SFP, SFP+, QSFP, XFP optical transceiver module. The heat dissipation solution may, however, be used in other types of optical transceiver modules. Also, the heat dissipation solution may be used in optical transmitters that have only a transmit side and do not have a receive side and in optical receivers that have only a receive side and do not have a receive side. The term "optical transceiver module", as that term is used herein, is intended to denote also such optical modules without limitation to any particular type or configuration of an optical module.

There are several key factors that contribute to the overall thermal resistance and thus temperature difference for a given thermal junction. Thermal resistance in conductive heat-transfer is expressed using Fourier's law, which states:

$$Q = k*A*\Delta T, \text{and}$$

$$R_{conduction} = 1/(k*A),$$

where Q=heat flux density, k=thermal conductivity, A=Surface area in contact, and ΔT is temperature difference. This means that in order to decrease the thermal resistance, $R_{conduction}$, and thus allow the temperature difference, ΔT, to be decreased, one must increase the thermal conductivity, k, and/or increase the size of the surface area, A, that is in contact at the thermal junction. An additional challenge is that any such thermal solution should also be able to absorb additional space caused by mechanical tolerance differences in the same way that the thermal pad 14 shown in FIG. 1 performs this function. The invention achieves these and other goals, as will now be described with reference to illustrative or exemplary embodiments shown in FIGS. 2-4B. Like numerals in FIGS. 1-4B represent like elements or features.

Figure 2:
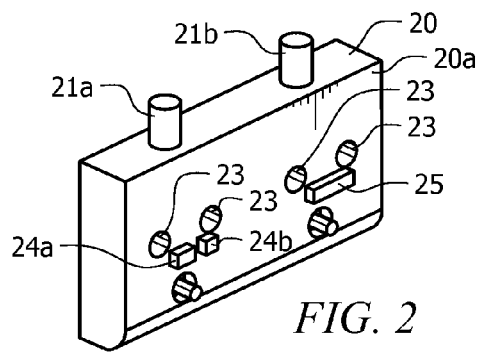
FIG. 2 illustrates a heat sink structure in accordance with an illustrative embodiment that may be used to replace the heat sink structure shown in FIG. 1.

FIG. 2 illustrates a heat sink structure 20 in accordance with an illustrative embodiment that could be used to replace the heat sink structure 14 shown in FIG. 1. Like the heat sink structure 14 shown in FIG. 1, the heat sink structure 20 is generally rectangular in shape and comprises a metal material, such as copper. The heat sink structure 20 may be identical to the heat sink structure 13 except that the heat sink structure 20 includes deformable metal protrusions 21a and 21b that the heat sink structure 13 does not include. The heat sink structure 20 may be made of one or more suitable materials having high thermal conductivity. Typically, the heat sink structure 20 will be made of a metal material. For example, the deformable metal protrusions 21a and 21b may be made of copper, which has a very high thermal conductivity (approximately 400 W/K-m) and is relatively soft (i.e., highly malleable), while the remainder of the heat sink structure 20 may be made of some other less malleable metal material that prevents it from being damaged, such as nickel-plated copper. The deformable metal protrusions 21a and 21b may integral parts of the structure 20 or they may be separate parts that are welded or bonded to the remainder of the structure 20.

The heat sink structure 20 has holes 23 formed in one side 20a thereof for receiving pins (not shown) of like cross-section extending from the OSA 8. The mating of the holes 23 with the pins (not shown) prevents movement of the OSA 8 relative to the heat sink structure 20 in directions that are transverse to the optical axes of the ferrules 7. Portions 24a and 24b of the heat sink structure 20 extend away from side 20a of the heat sink structure 20 in directions toward the OSA 8 and come into contact with the VCSEL driver IC (not shown) and the VCSEL 11, respectively. Portion 25 of the heat sink structure 20 extends away from the side 20a of the heat sink structure 20 in directions toward the OSA 8 and comes into contact with a receiver IC (not shown) of the OSA 8.

Figure 3A:
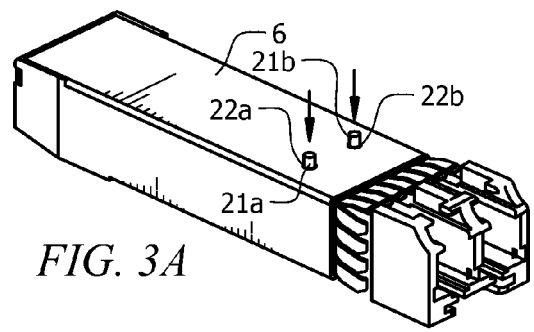
FIGS. 3A and 3B illustrate top perspective view and side cross-sectional views of an optical transceiver module that incorporates the heat sink structure shown in FIG. 2.
Figure 3B:
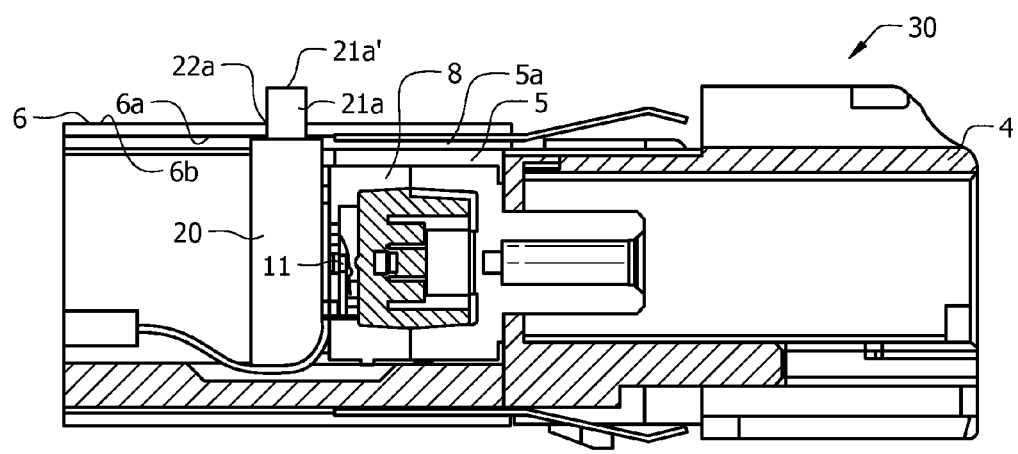
Figure 3C:
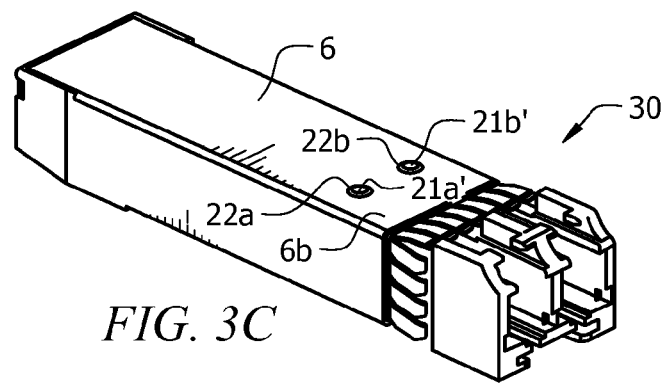
FIGS. 3C and 3D illustrate top perspective and side cross-sectional views, respectively, of the optical transceiver module shown in FIGS. 3A and 3B after deformable metal protrusions of the heat sink structure have been deformed.
Figure 3D:
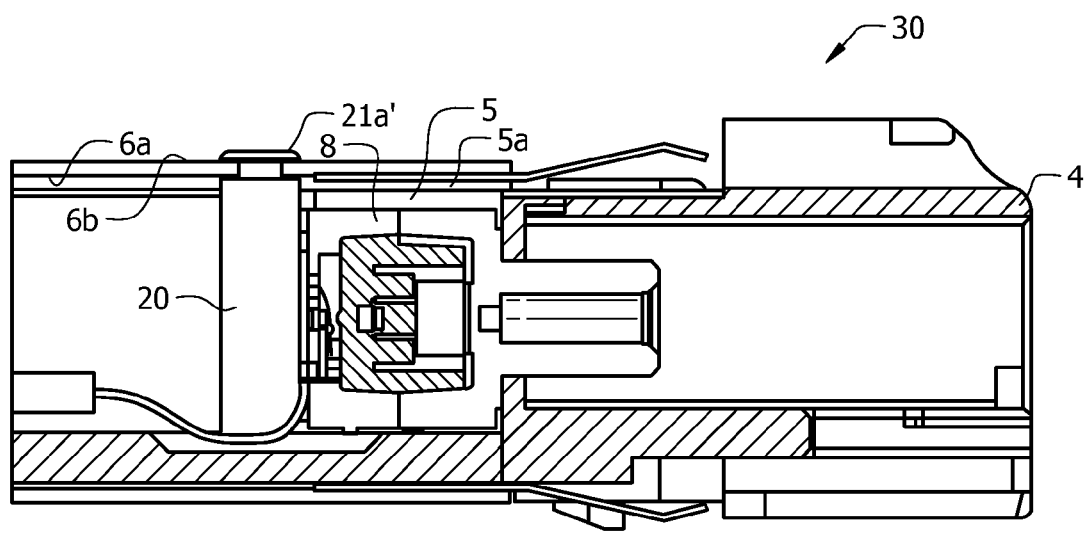

FIG. 3A illustrates a top perspective view of an optical transceiver module 30 that incorporates the heat sink structure 20 shown in FIG. 2. The optical transceiver module 30 may be identical to the optical transceiver module 2 shown in FIG. 1, except that the optical transceiver module 30 includes the heat sink structure 20 (FIG. 2) instead of the heat sink structure 13 (FIG. 1) and includes two generally circular openings 22a and 22b formed in the casing 6 through which the deformable metal protrusions 21a and 21b protrude, respectively. FIG. 3B illustrates a side cross-sectional view of the optical transceiver module 30 shown in FIG. 3A. In FIGS. 3A and 3B, the deformable metal protrusions 21a and 21b have not yet been deformed. FIGS. 3C and 3D illustrate top perspective and side cross-sectional views, respectively, of the optical transceiver module 30 shown in FIGS. 3A and 3B after the deformable metal protrusions 21a and 21b have been deformed.

In accordance with the illustrative embodiment shown in FIGS. 3A-3D, the deformable metal protrusions 21a and 21b are pin structures that are cylindrical in shape. It should be noted, however, that the invention is not limited with respect to the shapes of the protrusions 21a and 21b, as will be understood by persons skilled in the art in view of the description provided herein. The openings 22a and 22b formed in the casing 6 have diameters that are approximately equal to, but slightly greater than, the diameters of the cylindrically-shaped metal protrusions 21a and 21b. The protrusions 21a and 21b may be deformed by tapping them with a device such as a hammer. When the protrusions 21a and 21b are deformed, as shown in FIGS. 3C and 3D, the top portions 21a' and 21b' of the protrusions 21a and 21b, respectively, flatten out such that their diameters are significantly larger than the diameters of the circular openings 22a and 22b. The flattened out top portions 21a' and 21b' increase the size of the surface areas on the protrusions 21a and 21b that are in contact with the outer surface 6b of the module casing 6. This increase in the surface area in contact, A, results in a decrease in thermal resistance, $R_{conduction}$, along the thermal path from the substrate of the VCSEL 11 to the module casing 6. This increase in the surface area in contact, A, in combination with the increased thermal conductivity, k, of the heat sink structure 20 makes it possible to decrease the temperature difference, ΔT, between the temperature of the substrate of the VCSEL 11 and the temperature of the module casing 6. As indicated above, the ability to decrease this temperature difference is key to being able top operate the VCSEL 11 at higher data rates.

The thermal path for heat produced by the VCSEL driver IC (not shown) and by the VCSEL 11 is as follows: into the portions 24a and 24b, through the heat sink structure 20 into the bases of the protrusions 21a and 21b, from the bases of the protrusions 21a and 21b into the flattened top portions 21a' and 21b' of the protrusions 21a and 21b, and from the flattened top portions 21a' and 21b' of the protrusions 21a and 21b into the outer surface 6b of the module casing 6. Heat produced on the receive side (not shown) of the optical transceiver module 30 passes into portion 25 of the heat sink structure 20 and follows a similar path into the outer surface 6b of the module casing 6.

The deformation of the protrusions 21a and 21b in the manner depicted in FIGS. 3C and 3D also removes any additional space between the OSA 8 and the module body 5a caused by mechanical tolerance differences between these parts in the same way in which the thermal pad 14 shown in FIG. 1 performs that function. An additional benefit of the heat sink structure 20 results from the fact that the protrusions 21a and 21b essentially act as rivets that fixedly secure the heat sink structure 20 to the casing 6. Thus, the act of riveting the heat sink structure 20 to the casing 6 fixedly secures the OSA 8 to the casing 6 without the need for adhesives or additional fasteners.

It should be noted that while the heat sink structure 20 is depicted as having two protrusions 21a and 21b and two holes 22a and 22b for receiving the protrusions 21a and 21b, respectively, a single protrusion and a single hole may be used for this purpose. Alternatively, more than two protrusions and more than two respective holes may be used for this purpose. Also, the protrusions and holes may have other shapes, such as tabs and slots, respectively. Those skilled in the art will understand, in view of the description provided herein, the manner in which these and other modifications may be made to achieve the goals of the invention.

Figure 4A:
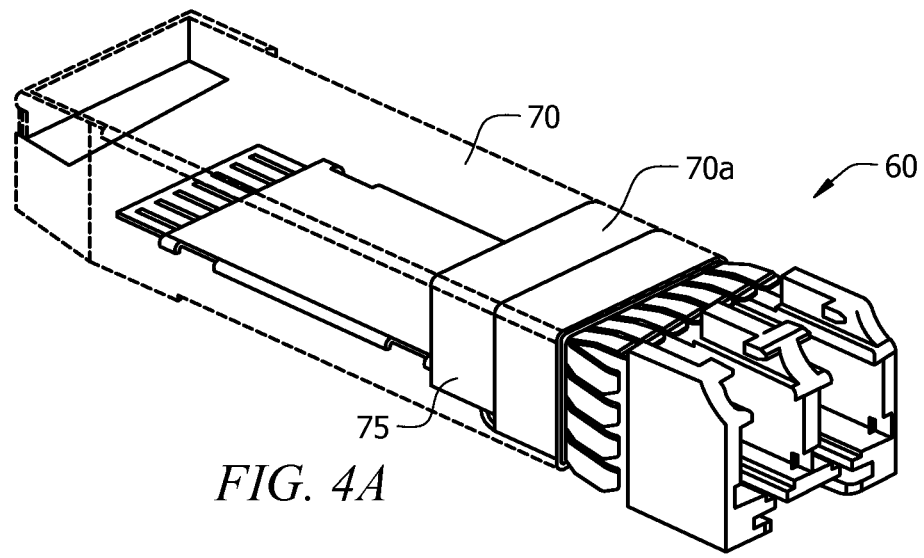
FIGS. 4A and 4B illustrate top perspective views of the optical transceiver module in accordance with another illustrative embodiment in which a portion of the casing of the module is deformable to increase contact surface area between the casing and the heat sink structure.
Figure 4B:
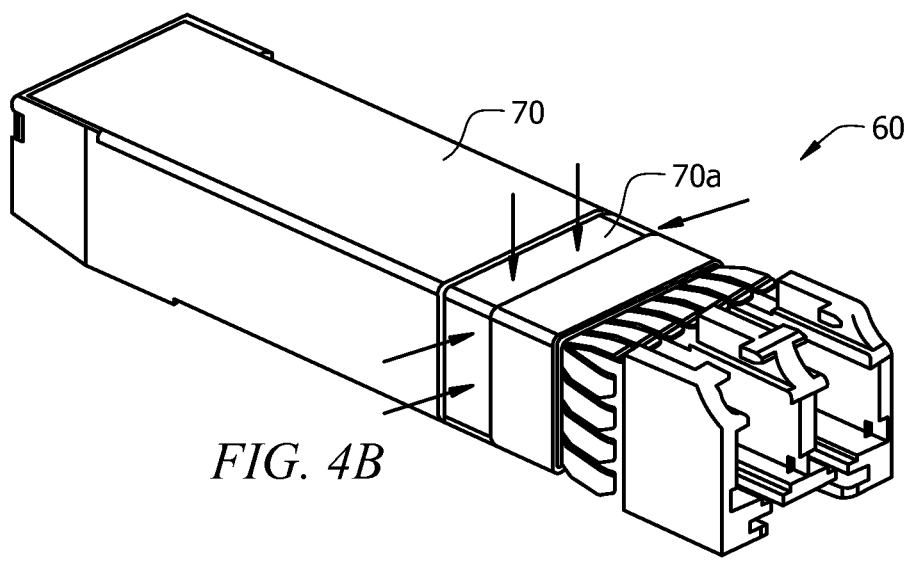

Another way in which thermal conductivity can be increased and thermal resistance decreased is to make the module casing deform to fit the heat sink structure rather than making the heat sink structure deform to fit the module casing, as will now be described with reference to FIGS. 4A and 4B. FIGS. 4A and 4B illustrate top perspective views of the optical transceiver module 60 in accordance with another illustrative embodiment in which a portion 70a of the module casing 70 is deformable. In accordance with this illustrative embodiment, a metal heat sink structure 75 that is identical or similar to the known heat sink structure 13 shown in FIG. 1 is used. The optical transceiver module 60 may be identical to the optical transceiver module 30 shown in FIGS. 3A-3D with the exception that it uses the heat sink structure 75 instead of the heat sink structure 20. The module casing 70 is made of a malleable metallic material, such as sheet metal, for example.

In FIG. 4A, the module casing 70 has been made transparent to allow the heat sink structure 75 to be seen. A circumferential portion 70a of the casing 70 surrounds the heat sink structure 75. The circumferential portion 70a is deformed by applying an inwardly-directed force against it, e.g., by crimping, to it press it against the casing 70. Crimping the circumferential portion 70a about the heat sink structure 75 increases the sizes of the surface areas on the casing 70 and on the heat sink structure 75 that are in contact, which decreases the thermal resistance along the thermal path from the substrate of the VCSEL 11 (FIG. 3B) to the module casing 70. In addition, crimping the circumferential portion 70a about the heat sink structure 75 performs the aforementioned function of removing additional space associated with any mechanical tolerance differences between the OSA 8 (FIG. 3B) and the module body 5a (FIG. 3B). An alternative to crimping is welding. Welding portions of the inner surfaces of the module casing 70 to the adjacent surfaces of the heat sink structure 75 increases the sizes of the surface areas on the casing 70 and on the heat sink structure 75 that are in contact with each other, thereby decreasing thermal resistance along the thermal path.

It should be noted that the invention has been described with reference to a few illustrative embodiments for the purposes of demonstrating the principles and concepts of the invention and the manner in which they may be implemented. The invention is not limited to these embodiments, but rather, a variety of modifications may be made to these embodiments without deviating from the scope of the invention. For example, although the illustrative embodiments depicted herein show particular configurations of deformable heat dissipation solutions, the invention is not limited to any particular configurations for the deformable heat dissipation solutions, as will be understood by those skilled in the art in view of the description being provided herein. Also, which the laser diode 11 has been described herein as being a VCSEL, the invention is not limited with respect to the type of laser that is used in the optical transceiver module, as will be understood by those skilled in the art. Any suitable light source may be used for this purpose. Also, although the invention has been described with reference to use with an SFP or SFP+ optical transceiver module, the invention is not limited to use with these types of optical transceiver modules. For example, the invention may be used with Quad SFP (QSFP) modules, SFF modules, XFP modules, etc. In addition, those skilled in the art will understand the manner in which modifications may be made to the embodiments described herein and that all such modifications are within the scope of the invention.

What is claimed is:

1. An optical transceiver module comprising:
   a module casing, the module casing having at least inner and outer surfaces and a first end having an opening formed therein;
   a receptacle secured within the opening formed in the first end, the receptacle being configured to receive at least a first optical connector having an end of at least a first optical fiber secured therein;
   an optical subassembly (OSA) disposed within the module casing, the OSA including at least a light source for producing light and an optics system for coupling the light produced by the light source between the end of the optical fiber and the light source; and
   a heat sink structure mechanically and thermally coupled to the OSA, at least a portion of the heat sink structure being in contact with a portion of the light source to allow heat produced by the light source to pass into the heat sink structure, at least one surface of the heat sink structure being in contact with the inner surface of the module casing to allow heat to pass from the heat sink structure into the module casing, and wherein at least one of the heat sink structure and the module casing is deformable in a predetermined manner such that when the heat sink structure or the module casing is deformed in said predetermined manner, a size of surface area on said at least one surface of the heat sink structure and a size of surface area on at least one surface of the module casing that are in contact with each other increase, and wherein the increase in the sizes of surface areas that are in contact with each other decreases thermal resistance along a thermal pathway from the light source to the module casing.

2. The optical transceiver module of claim 1, wherein the heat sink structure is deformable, the deformable heat sink structure including at least one protrusion that extends away from said at least one surface of the heat sink structure and passes through a hole formed in said at least one of the inner surfaces of the module casing, wherein the heat sink structure is deformed by flattening a top portion of said at least one protrusion against the outer surface of the module casing to increase the sizes of the surface areas of the heat sink structure and of the module casing that are in contact with each other.

3. The optical transceiver module of claim 1, wherein the heat sink structure is deformable, the deformable heat sink structure including at least first and second protrusion that extend away from said at least one surface of the heat sink structure and pass through first and second holes, respectively, formed in said at least one of the inner surfaces of the module casing, wherein the heat sink structure is deformed by flattening respective top portions of the first and second protrusions against the outer surface of the module casing to increase the sizes of the surface areas of the heat sink structure and of the module casing that are in contact with each other.

4. The optical transceiver module of claim 1, wherein when the heat sink structure or the module casing is deformed in said predetermined manner, the deformation removes additional space in the module caused by tolerance differences between some parts of the module.

5. The optical transceiver module of claim 1, wherein the receptacle secured within the opening formed in the first end of the module casing is also configured to receive at least a second optical connector having an end of at least a second optical fiber secured therein.

6. The optical transceiver module of claim 1, wherein the optical transceiver module is a small form factor (SFF) optical transceiver module.

7. The optical transceiver module of claim 6, wherein the SFF optical transceiver module is a small form factor pluggable (SFP) optical transceiver module.

8. The optical transceiver module of claim 7, wherein the SFP optical transceiver module is a quad SFP (QSFP) optical transceiver module.

9. The optical transceiver module of claim 1, wherein the module casing is deformable, the module casing comprising a malleable metal material and having a portion adjacent said at least one outer surface of the heat sink structure that is deformable, wherein when the deformable portion is deformed, the size of the surface area of the module casing and the size of the surface area of the heat sink structure that are in contact with each other increase, and wherein the increase in the sizes of surface areas that are in contact with each other decreases thermal resistance along a thermal pathway from the light source to the module casing.

10. The optical transceiver module of claim 9, wherein the deformable portion of the module casing is a crimped portion.

11. The optical transceiver module of claim 9, wherein the deformable portion of the module casing is a circumferential portion that surrounds side edges of the heat sink structure.

12. The optical transceiver module of claim 11, wherein inner surfaces of the deformable portion of the module casing are welded to the side edges of the heat sink structure.

13. The optical transceiver module of claim 9, wherein when the module casing is deformed, the deformation removes additional space in the module caused by tolerance differences between some parts of the module.

14. The optical transceiver module of claim 9, wherein the optical transceiver module is a small form factor (SFF) optical transceiver module.

15. The optical transceiver module of claim 14, wherein the SFF optical transceiver module is a small form factor pluggable (SFP) optical transceiver module.

16. The optical transceiver module of claim 15, wherein the SFP optical transceiver module is a quad SFP (QSFP) optical transceiver module.

17. A method for decreasing thermal resistance along a thermal path of an optical transceiver module comprising:
providing an optical transceiver module having a module casing, a receptacle secured within the module casing, and an optical subassembly (OSA) disposed within the module casing, the module casing having at least inner and outer surfaces and a first end having an opening formed therein, the receptacle housing being secured within the opening formed in the first end of the module casing, the OSA including at least a light source for producing light and an optics system for coupling the light produced by the light source between the end of the optical fiber and the light source;
disposing a heat sink structure within the module casing such that the heat sink structure is mechanically and thermally coupled to the OSA, at least a portion of the heat sink structure being in contact with a portion of the light source to allow heat produced by the light source to pass into the heat sink structure, at least one surface of the heat sink structure being in contact with the inner surface of the module casing to allow heat to pass from the heat sink structure into the module casing; and
deforming at least one of the heat sink structure and the module casing such that sizes of contacting surface areas on at least one surface of the heat sink structure and on at least one surface of the module casing increase, and wherein the increase in the sizes of the contacting surface areas decreases thermal resistance along a thermal pathway from the light source to the module casing.

18. The method of claim 17, wherein said deforming comprises deforming the heat sink structure, the heat sink structure including at least one protrusion that extends away from said at least one surface of the heat sink structure and passes through a hole formed in said at least one of the inner surfaces of the module casing, wherein the heat sink structure is deformed by flattening a top portion of said at least one protrusion against the outer surface of the module casing to increase the sizes of the surface areas of the heat sink structure and of the module casing that are in contact with each other.

19. The method of claim 17, wherein said deforming comprises deforming the heat sink structure, the heat sink structure including at least first and second protrusion that extend away from said at least one surface of the heat sink structure and pass through first and second holes, respectively, formed in said at least one of the inner surfaces of the module casing, wherein the heat sink structure is deformed by flattening respective top portions of the first and second protrusions against the outer surface of the module casing to increase the sizes of the surface areas of the heat sink structure and of the module casing that are in contact with each other.

20. The method of claim 17, wherein said deforming removes additional space in the module caused by tolerance differences between some parts of the module.

21. The method of claim 17, wherein the module casing comprising a malleable metal material and having a portion adjacent said at least one outer surface of the heat sink structure that is deformable, and wherein said deforming comprises deforming the deformable portion of the module casing, wherein when the deformable portion of the module casing is deformed, the size of the surface area of the module casing and the size of the surface area of the heat sink structure that are in contact with each other increase, and wherein the increase in the sizes of the contacting surface areas decreases thermal resistance along a thermal pathway from the light source to the module casing.

22. The method of claim 21, wherein the module casing is deformed by crimping the deformable portion of the module casing.

23. The method of claim 21, wherein the deformable portion of the module casing is a circumferential portion that surrounds side edges of the heat sink structure.

24. The method of claim 23, wherein inner surfaces of the deformable portion of the module casing are welded to the side edges of the heat sink structure.

25. The method of claim 21, wherein when the module casing is deformed, the deformation removes additional space in the module caused by tolerance differences between some parts of the module.

* * * * *